US012779749B2

(12) United States Patent
Yoon et al.

(10) Patent No.: US 12,779,749 B2
(45) Date of Patent: Nov. 3, 2026

(54) APPARATUS AND METHOD FOR EXPANDED POLYPROPYLENE MOLDING

(71) Applicant: SEOYON E-HWA CO., LTD., Anyang (KR)

(72) Inventors: Chi Won Yoon, Cheonan (KR); Hyeok Lee, Siheung (KR)

(73) Assignee: SEOYON E-HWA CO., LTD., Anyang (KR)

( * ) Notice: Subject to any disclaimer, the term of this patent is extended or adjusted under 35 U.S.C. 154(b) by 137 days.

(21) Appl. No.: 18/492,786

(22) Filed: Oct. 24, 2023

(65) Prior Publication Data

US 2024/0157614 A1 May 16, 2024

(30) Foreign Application Priority Data

Nov. 9, 2022 (KR) ........................ 10-2022-0148435

(51) Int. Cl.

*B29C 44/10* (2006.01)
*B29C 44/12* (2006.01)
*B29C 44/34* (2006.01)
*B29K 23/00* (2006.01)

(52) U.S. Cl.

CPC ............ *B29C 44/343* (2013.01); *B29C 44/10* (2013.01); *B29C 44/1266* (2013.01); *B29K 2023/12* (2013.01)

(58) Field of Classification Search

CPC ..... B29C 45/14; B29C 44/445; B29C 44/343; B29K 2023/12

See application file for complete search history.

(56) References Cited

U.S. PATENT DOCUMENTS 5,474,841 A 12/1995 Matsuki
6,261,489 B1 7/2001 Matsuki
9,757,884 B2 9/2017 Kong
10,622,833 B2 4/2020 Falk
(Continued)

FOREIGN PATENT DOCUMENTS

CN 1217684 A 5/1999
CN 205112217 U 3/2016
(Continued)

OTHER PUBLICATIONS

Office Action from German Patent Office, dated Nov. 20, 2024.
(Continued)

*Primary Examiner* — Alison L Hindenlang
*Assistant Examiner* — Debjani Roy
(74) *Attorney, Agent, or Firm* — Harvest IP Law, LLP

(57) ABSTRACT

Proposed are an apparatus and a method for expanded polypropylene (EPP) molding. The apparatus for EPP molding includes an upper mold, a lower mold forming a cavity, which is a space for manufacturing a molded product, together with the upper mold, a skin holding means provided at the upper mold or the lower mold, an insert holding means provided at one of the upper mold and the lower mold where the skin holding means is not provided, a resin supply means supplying a polypropylene resin to the cavity, a heating means applying heat to the polypropylene resin supplied to the cavity, and a mold driving means moving the upper mold and the lower mold in directions towards or away from each other.

9 Claims, 3 Drawing Sheets

(56) References Cited

U.S. PATENT DOCUMENTS

| | | | | |
|---|---|---|---|---|
| 2007/0160798 | A1 * | 7/2007 | Yeh | B32B 27/065 428/71 |
| 2014/0159357 | A1 | 6/2014 | Kong | |
| 2016/0263787 | A1 * | 9/2016 | Kong | B29C 45/33 |
| 2021/0221035 | A1 * | 7/2021 | Romanov | B29C 35/0805 |
| 2022/0339828 | A1 | 10/2022 | Michel | |
| 2023/0158719 | A1 | 5/2023 | Dauner | |

FOREIGN PATENT DOCUMENTS

| | | | | |
|---|---|---|---|---|
| CN | 208730160 | | * | 4/2019 |
| DE | 102013109066 | A1 | | 6/2014 |
| DE | 102013210616 | A1 | | 6/2014 |
| DE | 112013000921 | T5 | | 10/2014 |
| DE | 102017112438 | A1 | | 12/2018 |
| DE | 102020110665 | A1 | | 10/2021 |
| EP | 0583542 | B1 | | 3/1997 |
| EP | 2732951 | A1 | | 5/2014 |
| JP | 2000104771 | | * | 4/2000 |
| JP | 3625972 | B2 | * | 3/2005 |
| JP | 200939884 | | * | 2/2009 |
| KR | 10-2012-0124078 | A | | 11/2012 |

OTHER PUBLICATIONS

Steam-Chest Molding of Expanded Polypropylene Foams. 1. DSC Simulation of Bead Foam Processing, Sep. 17, 2010.
Steam-Chest Molding of Expanded Polypropylene Foams. 2. Mechanism of Interbead Bonding, Mar. 25, 2011.
IN Office Action dated Mar. 6, 2026.
CN Office Action dated May 26, 2026.

* cited by examiner

APPARATUS AND METHOD FOR EXPANDED POLYPROPYLENE MOLDING

CROSS REFERENCE TO RELATED APPLICATION

The present application claims priority to Korean Patent Application No. 10-2022-0148435, filed Nov. 9, 2022, the entire contents of which is incorporated herein for all purposes by this reference.

TECHNICAL FIELD

The present disclosure relates to an apparatus and a method for expanded polypropylene (EPP) molding.

BACKGROUND OF THE INVENTION

An expanded polypropylene (EPP) molding apparatus is used to manufacture EPP molded products of a specific shape by fusing EPP beads filled into a cavity of an EPP foam mold using high pressure and steam.

Because EPP products are more environmentally friendly than urethane products, they are used for steering wheel rims, sun visors, seats, tool cases, and door trims mounted in vehicles.

These EPP products are often used on their own because of their lightweight properties. However, when products are made only with EPP, they are vulnerable to scratches or dents on their surface and exhibit poor structural rigidity. Therefore, it is necessary to minimize scratches or dents by attaching a skin, such as fabric or film to the surface, or to enhance rigidity by inserting a rib or a bracket to overcome structural vulnerability.

However, conventional foam molding apparatuses had difficulty applying a skin or an insert simultaneously with EPP.

Meanwhile, the related art of the present application is disclosed in Korean Patent Application Publication No. 10-2012-0124078.

SUMMARY OF THE INVENTION

Accordingly, the present disclosure has been made keeping in mind the above problems occurring in the related art, and an objective of the present disclosure is to provide an apparatus and a method for EPP molding that can efficiently mold a skin or an insert with EPP.

In order to accomplish the above objective, according to one embodiment of the present disclosure, there is provided an apparatus for expanded polypropylene (EPP) molding, the apparatus including: an upper mold; a lower mold forming, in conjunction with the upper mold, a cavity, which is a space for manufacturing a molded product; a skin holding means provided at one of the upper mold and the lower mold; an insert holding means provided at one of the upper mold and the lower mold where the skin holding means is not provided; a resin supply means supplying a polypropylene resin to the cavity; a heating means applying heat to the polypropylene resin supplied to the cavity; and a mold driving means moving the upper mold and the lower mold in directions towards or away from each other.

The heating means may include: a steam supplier supplying steam to the cavity; and a heater heating the cavity.

The steam supplier may be provided at one of the upper mold and the lower mold where the insert holding means is provided and supply steam to the cavity, and the heater may heat the remaining one of the upper mold and the lower mold where the skin holding means is provided and indirectly heat the cavity.

The steam supplier may include: a steam supply pipe connected to the cavity; and a steam generator providing the steam to the steam supply pipe.

The skin holding means may hold, by vacuum suction, a skin to one of the upper mold and the lower mold where the skin holding means is provided.

The apparatus may further include: a cooling means cooling a molded product in the cavity.

The cooling means may include: a cooling water pipe provided at either the upper mold or the lower mold; and a cooling water supplier supplying cooling water to the cooling water pipe.

According to another embodiment of the present disclosure, there is provided a method for EPP molding, the method including: a preparation step of providing the above-described apparatus; a skin holding step of holding a skin to one of the upper mold and the lower mold by the skin holding means; an insert holding step of holding an insert to one of the upper mold and the lower mold by the insert holding means; a resin supply step of supplying the polypropylene resin to the cavity by the resin supply means in a state where the upper mold and the lower mold are combined by the mold driving means; a heating step of applying heat to the polypropylene resin supplied to the cavity by the heating means to foam the polypropylene resin and to bond the skin and the insert to the foamed polypropylene resin, thereby yielding a molded product; and a release step of positioning the upper mold and the lower mold a predetermined distance from each other using the mold driving means and removing the molded product from the upper and lower molds.

The method may further include: foaming the polypropylene resin by supplying the steam to the cavity via the steam supplier and by heating the cavity via the heater.

According to the present disclosure, it is possible to provide an apparatus and a method for EPP molding that can efficiently mold a skin or an insert with EPP.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, exemplary embodiments of the present disclosure will be described with reference to the drawings to provide specific contents for practicing the present disclosure.

Figure 1:
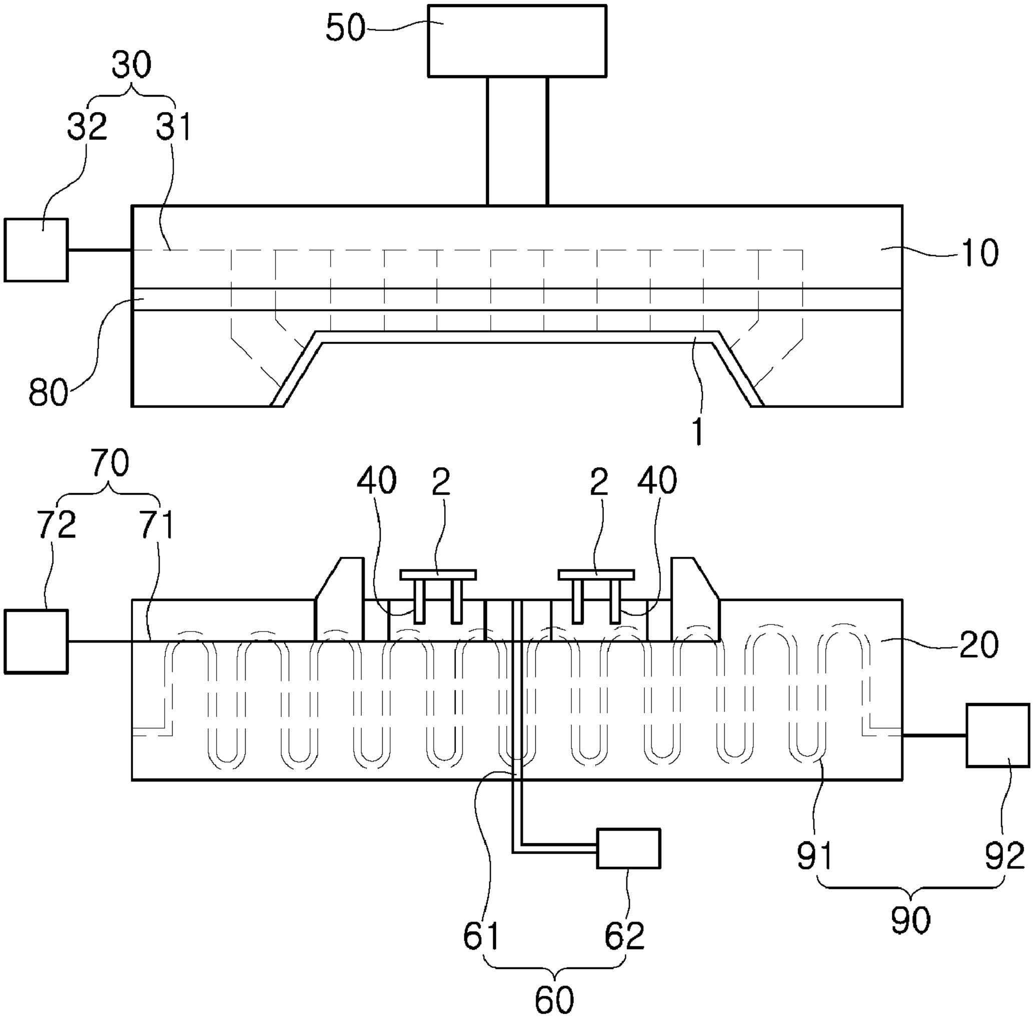
FIG. 1 is a sectional view illustrating an apparatus for EPP molding according to an embodiment of the present disclosure.
Figure 2:
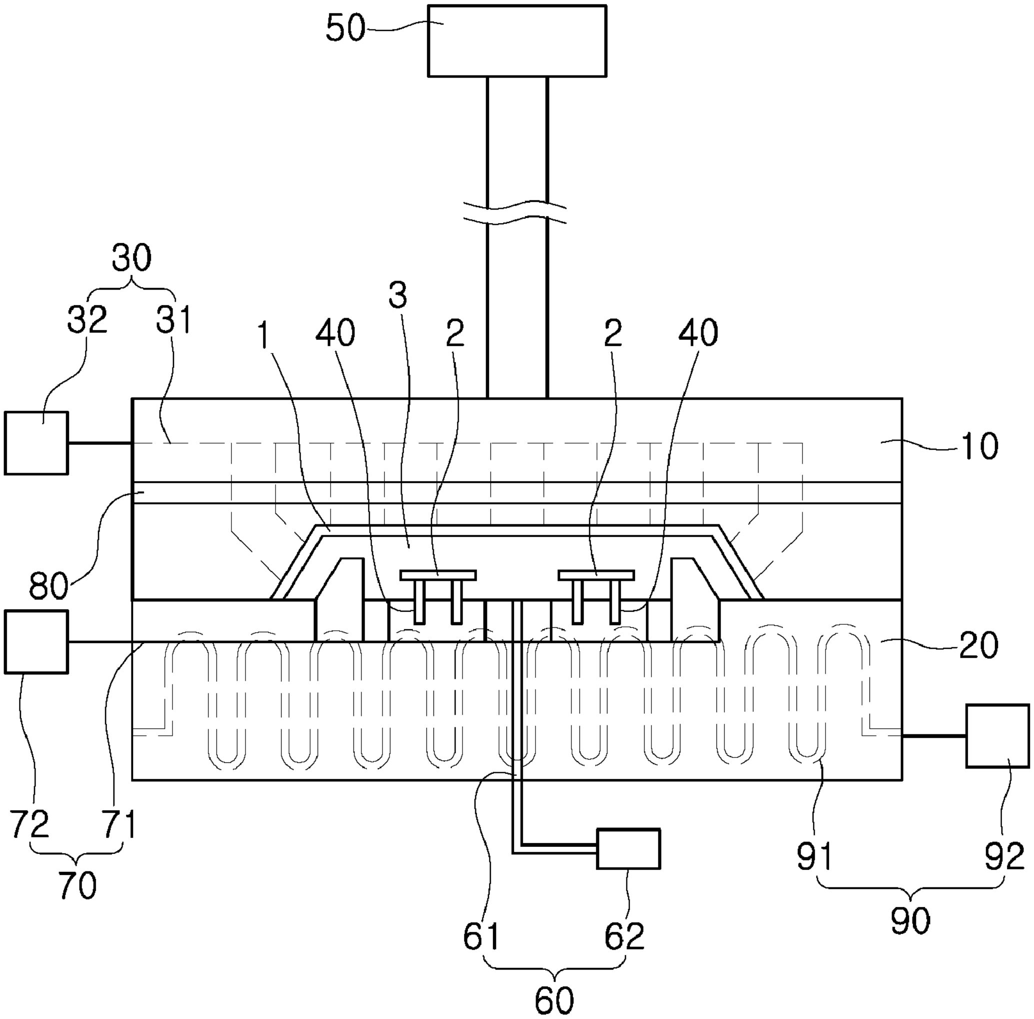
FIG. 2 is a view illustrating a state in which an upper mold and a lower mold illustrated in FIG. 1 are combined.
Figure 3:
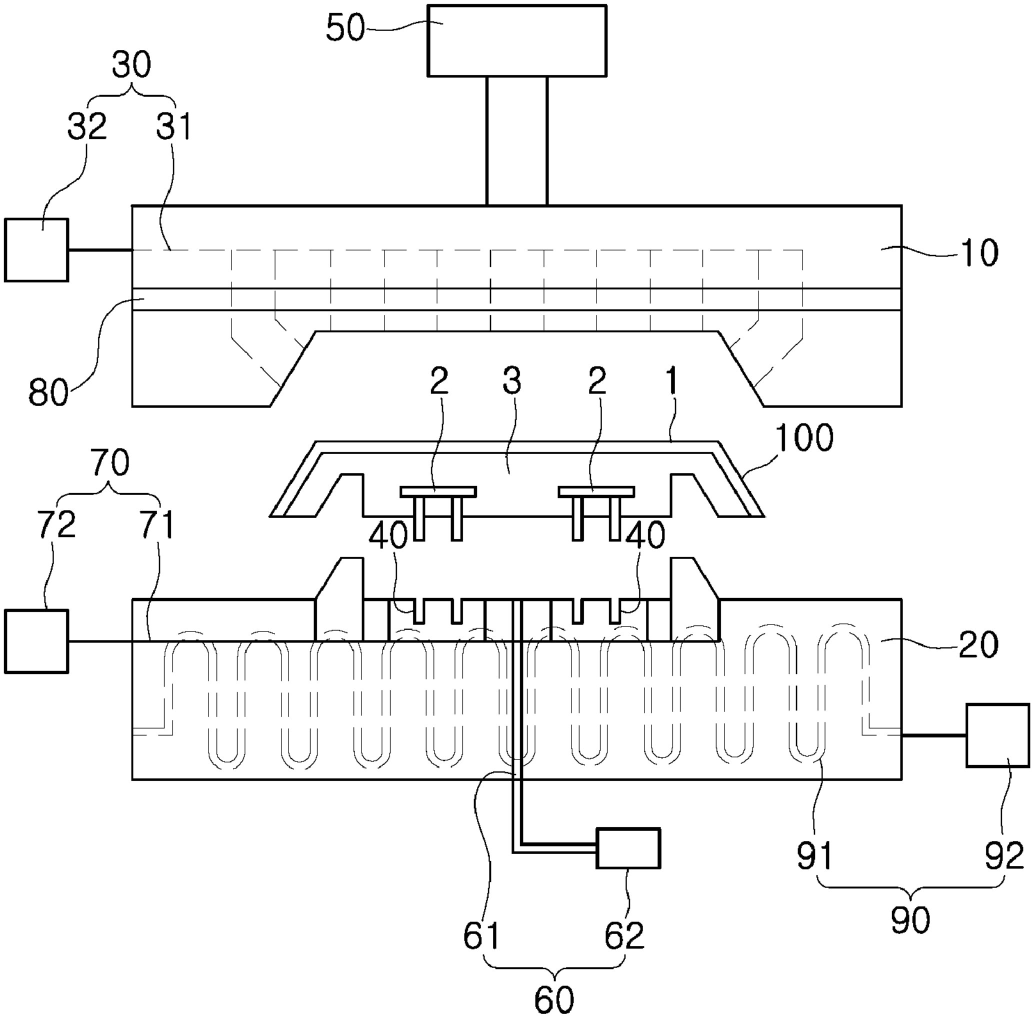
FIG. 3 is a view showing a state in which an EPP molded product is released.

FIG. 1 is a sectional view illustrating an apparatus for EPP molding according to an embodiment of the present disclosure. FIG. 2 is a view illustrating a state in which an upper mold and a lower mold illustrated in FIG. 1 are combined. FIG. 3 is a view showing a state in which an EPP molded product is released.

First, one embodiment of an apparatus for EPP molding according to the present invention will be described.

As illustrated in FIG. 1, the apparatus for EPP molding according to the present embodiment includes an upper mold 10, a lower mold 20, a skin holding means 30, an insert holding means 40, a heating means, and a mold driving means 50, a resin supply means 60, and a cooling means 90.

The upper mold 10, in conjunction with the lower mold 20, forms a cavity, which serves as a space for manufacturing a molded product 100.

The skin holding means 30 is provided at the upper mold 10 or the lower mold 20 to fix a skin 1 to a polypropylene resin 3.

The skin 1 may be made of either fabric or Polypropylene (PP) film, or a combination thereof.

In the present embodiment, as illustrated in FIG. 1, the skin holding means 30 is provided at the upper mold 10.

The skin holding means 30 holds the skin 1 by vacuum suction, and may include a vacuum pipe 31 and a vacuum pump 32. The vacuum pipe 31, where a vacuum is generated by the vacuum pump 32, extends to a plurality of locations on the upper mold 20, holding the skin 1 in place. Alternatively, a plurality of pressing pins may be used as the skin holding means 30.

The insert holding means 40 is provided at one of the upper mold 10 and the lower mold 20 where the skin holding means 30 is not provided, and may hold the insert 2 in place. As illustrated in FIGS. 1-3, the insert holding means 40 is in the form of a groove.

For the insert 2, a reinforcing rib, a fastener for fastening with other parts, a bracket, or the like may be used. The insert 2 may be manufactured using a separate injection apparatus.

In the present embodiment, since the skin holding means 30 is provided at the upper mold 10, the insert holding means 40 is provided at the lower mold 20.

The resin supply means 60 supplies the polypropylene resin 3 to the cavity. The resin supply means 60 may include a resin supply pipe 61 and a resin supplier 62. The polypropylene resin 3 provided by the resin supplier 62 is fed into the cavity through the resin supply pipe 61.

The heating means applies heat to the polypropylene resin 3 supplied to the cavity, and may include a steam supplier 70 and a heater 80.

The steam supplier 70 is provided at one of the upper mold 10 and the lower mold 20 where the insert holding means 40 is provided. The steam supplier 70 supplies steam directly to the cavity, and may include a steam supply pipe 71 and a steam generator 72. Steam generated from the steam generator 72 is supplied to the cavity through the steam supply pipe 71. In the present embodiment, since the insert holding means 40 is provided at the lower mold 20, the steam supplier 70 is also provided at the lower mold 20.

The steam supply pipe 71 is disposed to branch out to a plurality of locations in the cavity, including a central region and a peripheral region of the cavity, to supply steam over the entire surface of the cavity, and is connected to an upper surface of the lower mold 20.

The steam injected into the cavity by the steam supplier 70 foams the polypropylene resin 3 and simultaneously fuses the polypropylene resin 3 with the skin 1 and the insert 2.

The heater 80 indirectly heats the cavity by applying heat to one of the upper mold 10 and the lower mold where the skin holding means 30 is provided. In addition, the heater 80 also applies heat to the skin 1 so that the skin 1 and the foamed polypropylene resin 3 are firmly bonded together.

In the present embodiment, since the skin holding means 30 is provided at the upper mold 10, the heater 80 is also installed to heat the upper mold 10.

The heater 80 may heat the upper mold 10 using electricity, or may heat the upper mold 10 by providing a pipe that passes through the upper mold 10 and flowing steam through the pipe.

The heating means heats the polypropylene resin 3 in the cavity and simultaneously heats the skin 1 above the melting temperature of the foamed polypropylene resin 3 to bond the skin 1 and the polypropylene resin 3.

The mold driving means 50 moves the upper mold 10 and the lower mold 20 in directions towards or away from each other. As the molding driving means 50, a hydraulic device may be used.

The mold driving means 50 may drive the upper mold or the lower mold 20. In the present embodiment, as illustrated in FIGS. 1-3, the upper mold 10 is driven.

As illustrated in FIG. 1, while the upper mold 10 and the lower mold 20 are spaced apart from each other, the skin 1 is held by the skin holding means 30 and the insert 2 is held by the insert holding means 40. When the skin 1 and the insert 2 are secured, as illustrated in FIG. 2, the upper mold 10 and lower mold 20 are brought close to each other and combined, and the polypropylene resin 3 is injected into the cavity formed by their combination. After the foaming of the polypropylene resin 3 is completed, the upper mold 10 and the lower mold 20 are once again spaced apart from each other to release the molded product 100. During the molding process, the upper mold 10 and the lower mold 20 are moved closer to and away from each other by the mold driving means 50.

The cooling means 90 is configured to cool the molded product 100 in the cavity. By cooling the cavity after the foaming of the polypropylene resin 3 is complete, the cooling means 90 facilitate the release of the molded product 100.

The cooling means 90 may include a cooling water pipe 91 and a cooling water supplier 92. The cooling water pipe 91 may be provided at the upper mold 10, the lower mold 20, or both. In the present embodiment, the cooling water pipe 91 is installed at the lower mold 20 to cool the lower mold 20 and indirectly cool the cavity. The cooling water supplied by the cooling water supplier 92 flows through the cooling water pipe 91, thereby performing a so-called water cooling to cool the lower mold 20.

In FIG. 1, the steam supply pipe 71 of the steam supplier 70 or the cooling water pipe 91 of the cooling means 90 are illustrated as overlapping each other. However, this is merely for illustrative purposes, and they are not actually placed on the same plane and do not overlap each other. Also, since cooling occurs after heating is completed, the efficiency of heating or cooling does not decrease due to interference between the two elements.

Next, a method for EPP molding according to the present invention will be described hereinbelow.

The method for EPP molding according to the present invention includes a preparation step, a skin holding step, an insert holding step, a resin supply step, a heating step, a cooling step, and a release step.

The preparation step is a step of providing the above-described apparatus for EPP molding.

The skin holding step is a step of holding the skin 1 to the upper mold 10 using the skin holding means 30.

The insert holding step is a step of holding the insert 2 to the lower mold 20 using the insert holding means 40.

The resin supply step is a step of supplying the polypropylene resin 3 to the cavity by the resin supply means 60 in a state where the upper mold 10 and the lower mold 20 are combined by the mold driving means 50 to form the cavity.

The heating step is a step of applying heat to the polypropylene resin 3 supplied to the cavity by the heating means to foam the polypropylene resin 3 and to bond the skin 1 and insert 2 to the foamed polypropylene resin 3. This process includes supplying steam directly to the cavity through the steam supplier 70 while indirectly heating the cavity by heating the upper mold 10 through the heater 80.

The cooling step is a step of cooling the lower mold 20 by the cooling means 90 to cool the molded product 100 in the cavity to facilitate a release of the molded product 100.

The release step is a step of positioning the upper mold 10 and the lower mold 20 at a predetermined distance from each other using the mold driving means 50 and removing the molded product 100, which is formed by the foaming of the polypropylene resin 3 and the fusion of the skin 1 and the insert 2 with the foamed polypropylene resin 3, from the upper mold 10 and the lower mold 20.

In the above description, while specific contents for practicing the present disclosure have been provided by describing embodiments according to the present disclosure, the spirit and scope of the present disclosure are not limited to the embodiments and various changes and modifications are possible without departing from the spirit and scope of the present disclosure.

What is claimed is:

1. An apparatus for expanded polypropylene (EPP) molding, the apparatus comprising:

an upper mold;

a lower mold forming, in conjunction with the upper mold, a cavity, which is a space for manufacturing a molded product;

a skin holding means provided at the upper mold;

an insert holding means provided at the lower mold where the skin holding means is not provided;

a resin supply means supplying a polypropylene resin to the cavity;

a heating means applying heat to the polypropylene resin supplied to the cavity;

a mold driving means moving the upper mold and the lower mold in directions towards or away from each other; and a cooling means, wherein the heating means comprises a steam supplier supplying steam to the cavity; and a heater heating the cavity, wherein the steam supplier is provided at the lower mold where the insert holding means is provided, and the heater heats the upper mold where the skin holding means is provided and indirectly heats the cavity, wherein the steam supplier includes a steam supply pipe disposed to branch out to a plurality of locations in the cavity, including a central region and a peripheral region of the cavity, to supply the steam supplied by the steam supplier over an entire surface of the cavity, the steam supply pipe being connected to an upper surface of the lower mold, wherein the heater comprises a pipe that passes through the upper mold from one side of the upper mold to an opposite side, and steam flowing through the pipe does not enter the cavity, wherein the steam supplied through the steam supply pipe of the lower mold is supplied directly into the cavity, wherein the steam supply pipe includes a single straight main portion extending laterally in the lower mold and branch portions extending upward from the single straight main portion to the plurality of locations in the cavity;

wherein the resin supply means extends through the lower mold and includes an outlet disposed at the central region of the cavity, wherein the cooling means comprises a cooling water pipe extending laterally through the lower mold from one side of the lower mold to an opposite side of the lower mold and including a plurality of parallel laterally extending pipe portions connected by return bends, thereby defining a serpentine path in the lower mold to cool the lower mold and indirectly cool the cavity.

2. The apparatus of claim 1, wherein the steam supplier further comprises:

a steam generator providing the steam to the steam supply pipe.

3. The apparatus of claim 1, wherein the skin holding means holds, by vacuum suction, a skin to the upper mold where the skin holding means is provided.

4. The apparatus of claim 1, wherein the insert holding means holds an insert comprising a reinforcing rib, a fastener for fastening with other parts, or a bracket.

5. The apparatus of claim 1, wherein the resin supply means comprises:

a resin supply pipe; and a resin supplier providing the polypropylene resin to the cavity through the resin supply pipe.

6. The apparatus of claim 1, wherein the mold driving means comprises a hydraulic device configured to move the upper mold towards or away from the lower mold.

7. The apparatus of claim 3, wherein the skin comprises fabric, a polypropylene film, or a combination thereof.

8. The apparatus of claim 3, wherein the skin holding means comprises:

a vacuum pipe extending to a plurality of locations on the upper mold; and a vacuum pump configured to generate a vacuum in the vacuum pipe.

9. The apparatus of claim 4, wherein the insert holding means comprises a groove.

* * * * *